Patented July 20, 1926.

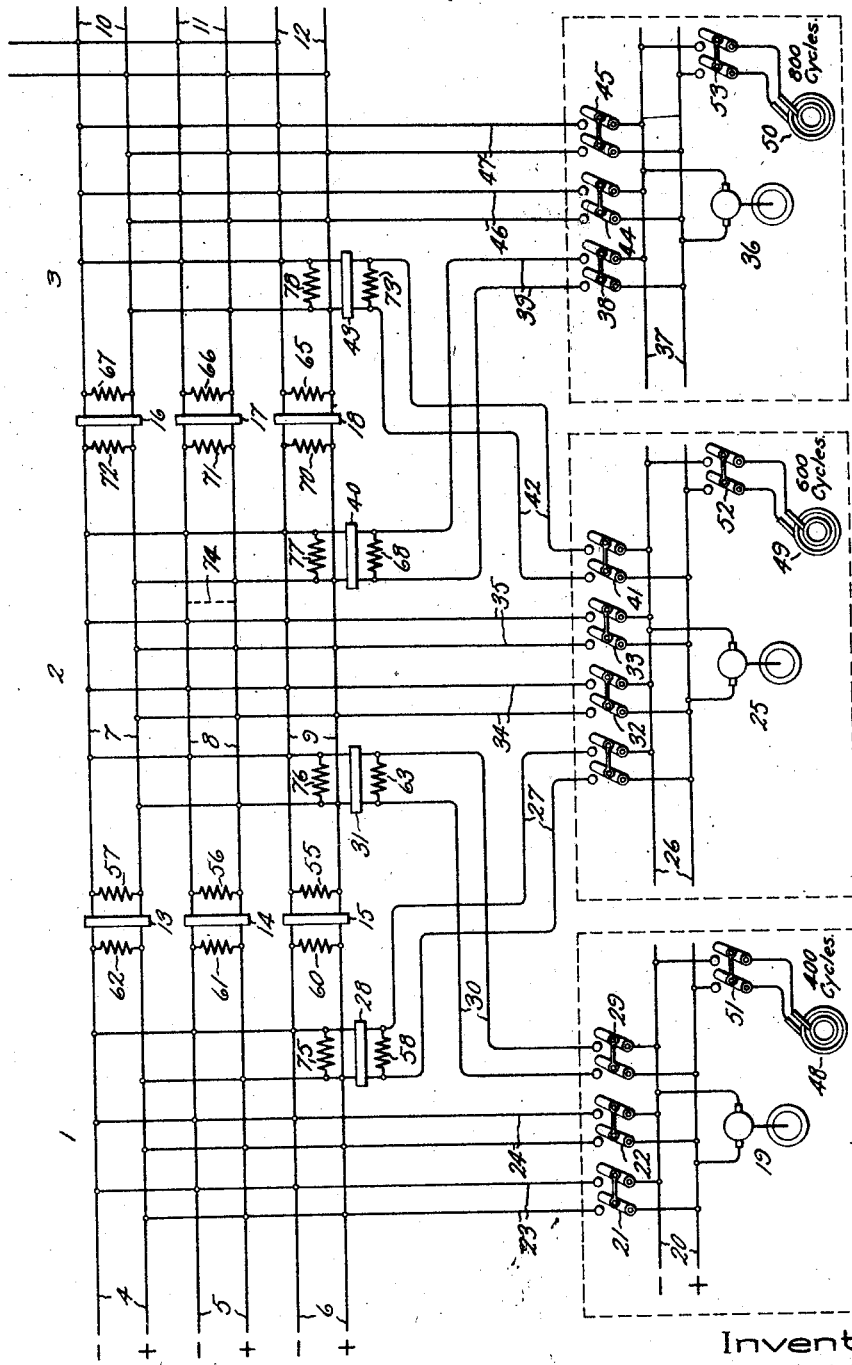

1,593,369

UNITED STATES PATENT OFFICE.

CHARLES W. STONE, OF NISKAYUNA, NEW YORK, ASSIGNOR TO GENERAL ELECTRIC COMPANY, A CORPORATION OF NEW YORK.

PROTECTIVE SYSTEM.

Application filed May 28, 1924. Serial No. 716,523.

My invention relates to protective systems, and has for its object the provision of a system of this character which comprises means operable in response to current of a predetermined frequency for selectively isolating a faulty section or district in a network of electric power mains.

In large cities, it frequently happens that the power mains of the distribution system are permanetly interconnected to form an intricate network of conductors located in underground conduits or other more or less inaccessible places. Current to this network is supplied from a number of substations located at different points. Under these conditions, a short circuit at any point of the network is a serious matter for the reason that all the substations feed current into the short circuit and the network is rendered practically incapable of supplying useful load current. Heretofore, it has been customary to open such a short circuit by supplying it with current until the network conductors are burned free from the fault. This procedure of course takes time and may produce serious interruptions in service. In accordance with my invention, this difficulty is in a large measure avoided by interconnecting the various sections of the network through circuit breakers which are arranged to be selectively operated by means of alternating currents transmitted to the network at different predetermined frequencies. To facilitate an understanding of my invention, it will be described as applied to a direct current power distribution system comprising a plurality of interconnected lines having their different sections connected together through oil switches or other suitable circuit control devices for isolating a district of the network when it developed a fault.

My invention will be better understood on reference to the following description when considered in connection with the accompanying drawing and its scope will be pointed out in the appended claims.

The figure shows a distribution network in which a plurality of districts 1, 2 and 3, each comprise a plurality of interconnected direct current line sections 4, 5 and 6, 7, 8 and 9, and 10, 11 and 12, respectively. The line sections 4 and 7, 5 and 8, 6 and 9, 7 and 10, 8 and 11, and 9 and 12, are arranged to be interconnected through switches 13, 14, 15, 16, 17 and 18 respectively. Current is supplied to the line sections 4, 5 and 6 in the district 1 from a direct current source 19 through substation buses 20, switches 21 and 22, and feeders 23 and 24, and from a direct current source 25 through substation buses 26, feeder 27 and switch 28. The line sections 7, 8 and 9 are arranged to be supplied with current from the source 19 through station buses 20, switch 29, feeder 30 and switch 31, from the source 25 through station buses 26, switches 32 and 33, and feeders 34 and 35, and from the source 38, feeder 39 and switch 40. The line sections 10, 11 and 12 are likewise arranged to be supplied with current from the source 25 through station buses 26, switch 41, feeder 42 and switch 43, and from the source 36 through station buses 37, switches 44 and 45, and feeders 46 and 47.

The buses 20, 26 and 37 may be each located at a different power station or substation as indicated by dotted lines in the drawing. For the purpose of selectively operating the switches by which a faulty network section is isolated, the high frequency current sources 48, 49 and 50 are arranged to be connected to the station buses 20, 26 and 37, respectively, through switches 51, 52 and 53. As indicated by the legends "400 cycles," "600 cycles" and "800 cycles," the sources 48, 49 and 50 are designed to deliver current at different frequencies. The source 48 is provided to supply current for energizing the operating coils 76, 60, 61, 62 and 58 of the switches 31, 15, 14, 13 and 28 respectively; the generator 49 is provided to supply current for energizing the operating coils 75, 55, 56, 57, 63, 78, 70, 71, 72 and 68 of the switches 28, 15, 14, 13, 31, 43, 18, 17, 16 and 40 respectively, and the generator 50 is provided to supply current for energizing the operating coils 77, 65, 66, 67 and 73 of the switches 40, 18, 17, 16 and 43 respectively. In other words, in the arrangement illustrated generator 48 controls the switches 13, 14 and 15 at the left side of section 2 and the switches 28 and 31 shown at each side of those switches; generator 50 controls the switches 16, 17 and 18 at the right side of section 2 and the switches 40 and 43 shown at each side of those switches, while generator 49 operates all of the switches controlled by both generators 48 and 50.

It will be observed that the switches are each provided with a pair of operating coils which are responsive to currents of different frequencies. This arrangement is provided to render possible the selective operation of the various switches in a manner readily understood if it be assumed that the line section 8 of district 2 is short circuited at 74. The operating equipment of the different switches may be arranged to respond after different predetermined time intervals if desired for the purpose of insuring that the switch nearest the high frequency source is the last to open.

When a short circuit occurs at 74, the section in trouble will be readily determined by observing the relative proportions of the total current fed into the short circuit by the various substations. Thus, with a short circuit at 74, the load on the substation comprising the source 25 will be greatly increased and in order to isolate district 2, the switch 52 is closed to supply current from generator 49 to the network through feeders 27, 34, 35 and 42, for operating all of the switches to isolate section 2 from the remainder of the network. If a short circuit occurs on one of the line sections in district 1, the switch 51 is closed and current at 400 cycles, for example, is supplied from generator 48 to the network through feeders 23, 24 and 30 for operating the switches 13, 14 and 15, 28 and 31 by which section 1 is isolated from the remainder of the network. Likewise, when a short circuit occurs on any line section of district 3, the switch 53 is closed and current is supplied at 800 cycles from the generator 50 to the network through feeders 39, 46 and 47 for energizing the switches 16, 17, 18, 40 and 43 by which this system is isolated from the network.

Each of the switches may be provided with two closing coils arranged to respond to freqencies different from those at which the corresponding opening coils are actuated or any other suitable means responsive to frequency may be utilized selectively to open and close the various switches. The diagrammatic showing of such means would amount to nothing more than a duplication of the switch opening means illustrated and they have therefore been omitted to simplify the drawing. While the means for operating the various switches have been referred to as coils, it will of course be understood that any suitable form of frequency responsive relay equipment will be used.

While I have illustrated and described my invention as applied to a network comprising three districts, it will be apparent that it is applicable to systems which comprise a large number of network districts and line sections supplied with current from different substations and arranged to be segregated from one another. I accordingly do not wish to be restricted to the particular arrangement disclosed herein by way of example, for the purpose of setting forth my invention in accordance with the patent statutes. The terms of the appended claims are, therefore, not restricted to the precise arrangement disclosed but are intended to cover all changes and modifications within the true spirit and scope of my invention.

What I claim as new and desire to secure by Letters Patent of the United States, is:—

1. A system of the class described comprising a plurality of network districts, switches for segregating said network districts and means responsive to currents of predetermined frequencies for selectively operating said switches to segregate any one of said districts from the remainder of the network.

2. A power distribution network comprising a plurality of separable districts arranged to be supplied with current from different substations, means responsive to current of a predetermined frequency for selectively segregating one of said districts from the remainder of the network, and an alternating current source at the substation of said district for supplying to said district current of said predetermined frequency to actuate said current responsive means.

3. A power distribution network comprising a plurality of separable line sections respectively provided with control means operable in response to currents of different predetermined frequencies for segregating them from the remainder of the network, and means associated with said line sections for supplying currents of said different frequencies selectively to actuate said control means.

4. The method of selectively controlling the connections of a district in a direct current network comprising a plurality of districts separable in response to actuation of switches located at junction points between the remainder of the network and said district which consists in supplying current of a predetermined frequency to said district for operating said junction point switches.

5. A power distribution network comprising a plurality of separable districts arranged to be supplied with current from different substations, means respectively responsive to currents of different predetermined frequencies for controlling the connections between each of said districts and the remainder of the network, and an alternating current source associated with the substation of each district for supplying to the system current of the predetermined frequency required to actuate the current responsive means to isolate the corresponding district.

In witness whereof, I have hereunto set my hand this 26th day of May, 1924.

CHARLES W. STONE.